F. P. HINCKLEY.
COMBINED VALVE AND VALVE STEM.
APPLICATION FILED SEPT. 30, 1920. RENEWED FEB. 21, 1922.
1,431,658.
Patented Oct. 10, 1922.
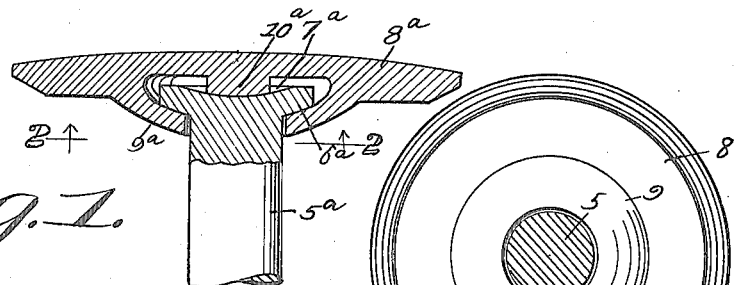
Fig. 1.
Fig. 2.
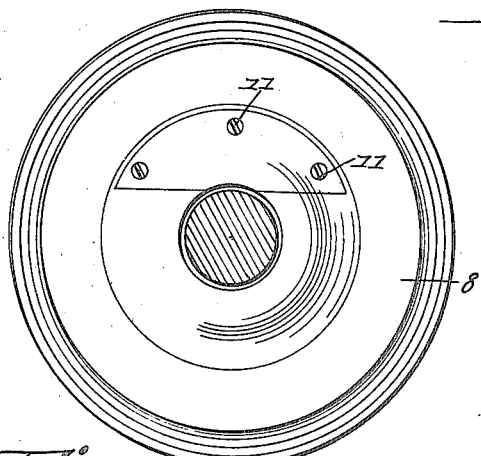
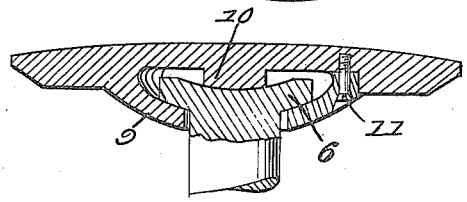
Fig. 3.
Fig. 4.
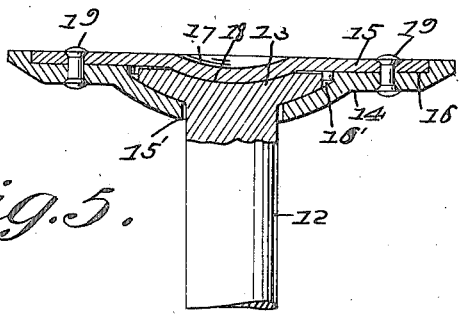
Fig. 5.
Inventor
Frederick P. Hinckley.
By Frank S. Ann[...],
Attorney Patented Oct. 10, 1922.

1,431,658

UNITED STATES PATENT OFFICE.

FREDERICK P. HINCKLEY, OF JACKSON, MICHIGAN.

COMBINED VALVE AND VALVE STEM.

Application filed September 30, 1920, Serial No. 413,699. Renewed February 21, 1922. Serial No. 538,367.

*To all whom it may concern:*

Be it known that I, FREDERICK P. HINCKLEY, a citizen of the United States of America, and resident of Jackson, in the county of Jackson and State of Michigan, have invented certain new and useful Improvements in Combined Valves and Valve Stems, of which the following is a specification.

This invention relates to combined valves and valve stems and more particularly to a valve for internal combustion motors which obviates the necessity for regrinding the valves of that type.

The necessity for regrinding valves arises because of the fact that the valve stems become warped, or the guides for the valve stems warp, or on account of the distortion or warping of the cylinders. It is an object of this invention, therefore, to provide a valve and a valve stem having oscillatory motion with relation to each other, in order that compensation for irregularities may automatically occur.

In certain types of valves it may be desirable and perhaps preferable to produce a valve and a stem having the characteristics above indicated and to provide means whereby the valve may be removably applied to the valve stem in order that when the parts become worn, the worn part may be removed and a new one substituted at a cost less than the expense of regrinding the valve or otherwise repairing it.

An object of this invention, therefore, is to provide a novel valve and novel valve stem, and means whereby the two elements are securely held together to operate without lost motion between the joints so that the valves of the preferred constructions of the invention will have advantages in that they can be readily replaced on the valve stem without injury or damage to the said stem; and furthermore to produce a valve having a stem which will permit the valve to always seat regardless of the position of the valve stem with relation to the valve, within predetermined bounds, and to produce a valve which may have oscillatory motion with respect to the valve stem so that the valve will seat regardless of the alinement between the valve head and the axis of the valve stem. It has been found in practice that a valve and stem made in accordance with the invention will permit the valve to seat even though the valve stem or its guide has warped or if the cylinder has become warped.

A still further object of this invention is to provide novel means for clamping or holding the valve on the stem, the said means comprising comparatively few inexpensive parts having the objects and functions stated.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in section through the valve and stem, a portion of the stem being shown in elevation;

Figure 2 illustrates a sectional view on the line 2—2 of Fig. 1;

Figure 3 illustrates a sectional view embodying the modification;

Figure 4 illustrates an underneath plan view thereof, the valve stem being in section, and Figure 5 illustrates a sectional view of a further modification.

In these drawings $5^a$ denotes the valve stem having a flanged head $6^a$, preferably provided with a recess $7^a$ in its upper end. The valve $8^a$ has an annular flange $9^a$ in its inner side, which prior to its being bent, has a clearance sufficient to receive the flange of the stem; thereafter the said flange of the valve is rolled to cause it to extend partially across and engage the flange of the valve stem. The wall of the recess $7^a$ is curved and the valve stem has a lug or boss $10^a$ which bears against the said curved surface.

In Figures 3 and 4, which shows a preferred form of the invention, the valve 8 has a downwardly curved flange 9 extending from its inner side, and the said flange has ends with a space between them, the said space being at least equal to the diameter of the flanged head 6 of the valve stem to provide clearance space therefor. The inner surface of the flanged head 6 is slightly curved in order that it may fit the contour of the flange which it engages, and the said valve has a lug or boss 10 fitted against the recessed surface of the end of the valve stem to effect a close joint between the valve stem and the valve or the parts associated with them.

That portion of the flange of the valve stem between the ends of the curved flange 9 is engaged by a clamping plate of the general cross sectional configuration of the curved flange 9, and it bears against the flange of the valve stem; being held in position in the present embodiment of the invention by fastenings 11 such as screws which extend through the clamping plate and are imbedded in the valve.

The construction of the device is well shown in the several views of the drawing, and it is believed that one skilled in the art will understand the practice of the invention from such a disclosure.

In Figure 5 I have illustrated a modified and preferred construction in which a valve stem 12 has a head 13 of the general form of the one shown in the other figures of the drawing. The valve 14 in this embodiment has an aperture 15' for the reception of the valve stem and it has a concavity 16' in which the flange of the valve stem is seated. The valve and valve stem are clamped together and held in assembled relation with each other by a clamping plate 15 which lies in a recess 16 in the upper or outer surface of the valve; the said clamping plate preferably having an inwardly curved central portion 17 lying in the recess 18 in the upper or outer end of the valve stem. The clamping plate in this embodiment of the invention is connected or attached to the valve by fastenings 19 such as rivets which extend through the clamping plate and valve as fully shown in Figure 5.

From the foregoing description it will be apparent that the valve may move with respect to the axis of the valve stem for the purpose of insuring the proper seating of the valve and should the valve illustrated in Fig. 5 become impaired, it can be readily removed from the valve stem by cutting the rivets to dissociate the valve and clamping plate and a new valve may be supplied and the old clamping plate may be employed, though if desired, a new valve and clamping plate may be employed and assembled with the valve stem.

I claim:

1. In a combined valve and stem, a stem having a head provided with a flange at its outer end and a recess in its said outer end, a valve having a lug on its inner surface lying in the recess of the valve stem, and means carried by the valve engaging the flange of the valve stem for holding the valve stem and valve in removable relation to each other.

2. In a combined valve and stem, a valve stem having a recess in its outer end, a valve having an aperture to receive the stem and having a portion bearing on the wall of the recess of the valve stem, a flange on said valve engaging the valve stem whereby the valve has oscillatory motion with relation to the valve stem.

3. In a combined valve and stem, a valve stem having a flange, the said valve stem having a recess in its outer end, a valve having an aperture to receive the stem and a flange to engage the flange of the valve stem, a member carried by the valve extending into the recess of the valve stem and adapted to bear on the wall thereof, and a clamping plate secured to the said valve and engaging the flange of the valve stem for holding the valve stem and valve in removable relation to each other.

4. In a combined valve and valve stem, a valve stem having a flange at its outer end, a valve having a concaved recess in its outer surface and an aperture approximately centrally thereof to receive the valve stem and flange, a clamping plate for clamping the valve stem and its flange in removable relation to the valve, and means for securing the clamping plate to the said valve.

FREDERICK P. HINCKLEY.